United States Patent [19]
Hsu

[11] Patent Number: 6,119,584
[45] Date of Patent: Sep. 19, 2000

[54] GRILLER

[75] Inventor: Tony Hsu, Yung Kang, Taiwan

[73] Assignee: Lundar Electric Industrial Co., Ltd., Tainan Hsien, Taiwan

[21] Appl. No.: 09/431,044

[22] Filed: Nov. 1, 1999

[51] Int. Cl.[7] ............................. A47J 1/00; A47J 37/00; A47J 37/06
[52] U.S. Cl. ................... 99/341; 99/393; 99/395; 99/400; 99/427; 99/446; 99/450; 219/400
[58] Field of Search ...................... 99/331, 341, 372–380, 99/385–395, 419–421 V, 400, 401, 444–450, 451, 426, 427, 393–399; 219/492, 521, 400, 678, 685, 700, 703; 126/25 R, 9 R

[56] References Cited

U.S. PATENT DOCUMENTS

| | | | |
|---|---|---|---|
| 2,581,570 | 1/1952 | Amanatides | 99/421 V |
| 2,687,080 | 8/1954 | Dorin | 99/421 V |
| 3,867,877 | 2/1975 | Zajc | 99/393 X |
| 3,959,620 | 5/1976 | Stephen, Jr. | 99/447 X |
| 4,072,092 | 2/1978 | Kohli et al. | 99/389 |
| 4,165,731 | 8/1979 | Lehtovaara | 99/385 X |
| 4,469,019 | 9/1984 | Baer | 99/393 X |
| 4,481,408 | 11/1984 | Scheufler | 219/386 X |
| 4,492,152 | 1/1985 | DeSantis | 99/397 |
| 4,562,771 | 1/1986 | Williams | 99/397 |
| 4,805,587 | 2/1989 | Schweitzer | 99/340 |
| 5,117,748 | 6/1992 | Costa | 99/427 |
| 5,431,093 | 7/1995 | Dodgen | 99/427 |

*Primary Examiner*—Timothy Simone
*Attorney, Agent, or Firm*—Rosenberg, Klein & Lee

[57] ABSTRACT

A griller is provided which includes a case and a grill set mounted within the case. The case has a hollow body and electric heaters internally located with a gear box and a motor. The grill set is driven by the gear box and the case is formed having a recess within a top portion of the case. The grill set is formed with a screen, screen cover, socket, rod and fixture where the socket is secured within the center of the screen with opposing ends formed in a rounded contour and placed within the recesses of the case. The socket has a shank which is formed with a step-like section for insertion of the screen cover. The fixture is secured within the step-like section of the socket to facilitate assembling the screen and the screen cover with the rod secured in the socket having one end engaged with the gear box and rotatively driven by the motor.

6 Claims, 5 Drawing Sheets

GRILLER

FIELD OF THE INVENTION

This invention relates to a griller and more particular to a griller having a hollow case with a turnable and width adjustable grill set therein, and a cover is openable to place and take away food and easy to clean

BACKGROUND OF THE INVENTION

The convention grillers are generally in two different types, one is in vertical type while the other in horizontal type of griller, both or which grill food in a flat fixed position and it sometimes causes the grill unevenly, thus a turnable grill by secured the two ends of the grill to the respective sides of the griller and driving by a motor and the electric heaters are secured on the top and the bottom panels, thus when the grill spins, the food will be heated evenly by the heaters. However, the food is not easy to be taken away from the griller.

SUMMARY OF THE INVENTION

It is the primary object of the present invention to provide a griller which has an adjustable width for an easy operation.

It is another object of the present invention to provide the griller which has the electric heaters secured at the inner recess that are closer to the food for grilling.

It is a further object of the present invention to provide the griller which has a transparent cover that provides a clear view of the food in the griller.

DETAILED DESCRIPTION OF THE PREFERRED EMBODIMENT

Figure 1:
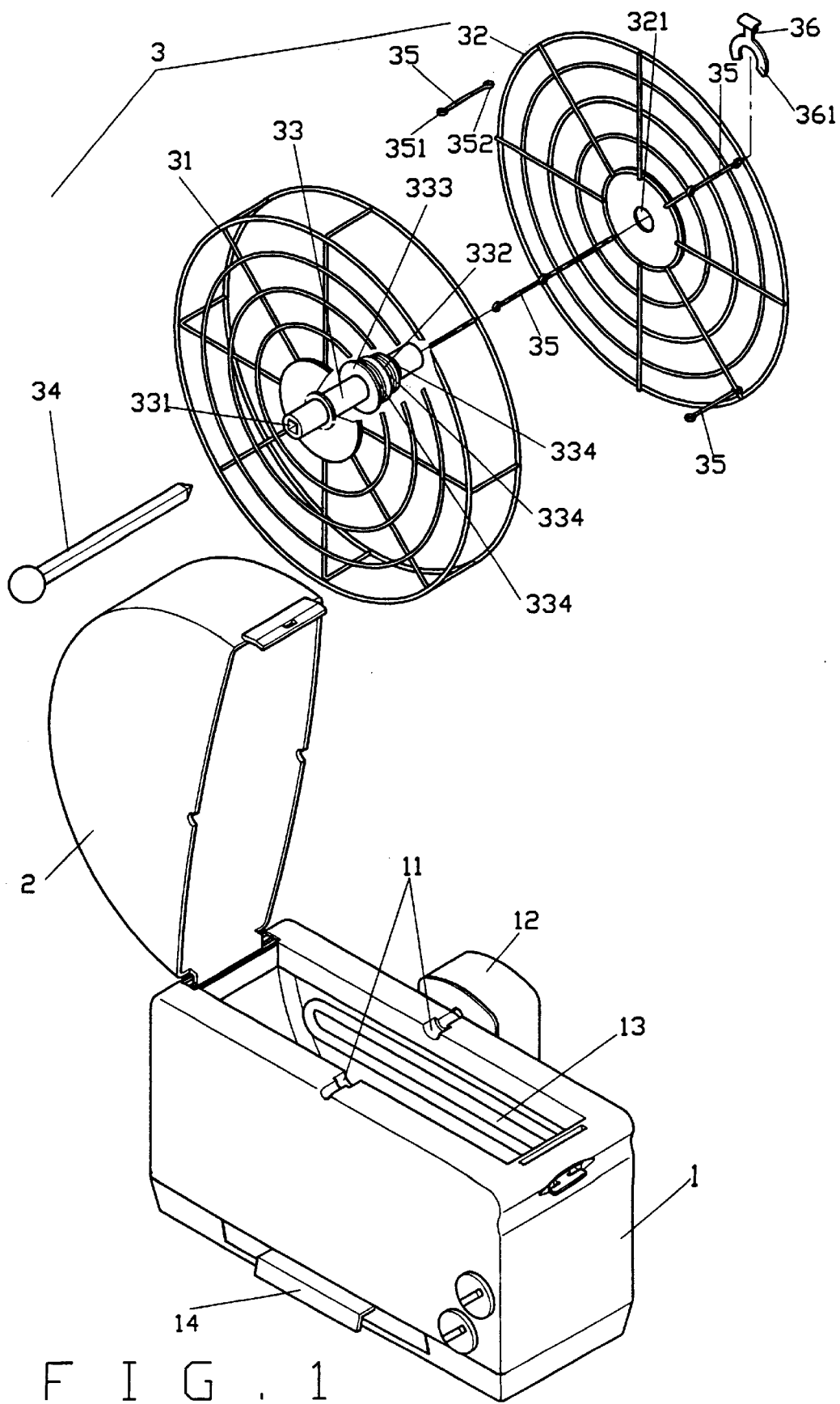
FIG. 1 is an exploded view of the present invention.

The griller of the present invention, as shown in FIGS. 1, 2, 3 and 4 comprises a hollow case 1 having recesses 11 at the top portion and electric heaters 13 secured in the inner sides thereof and a cover 2 connected to one end of the case 1 so that it may be open from the other end, the bottom of the case 1 has a drip pan 14, one side of tile case 1 has a gear box 12 having a motor and reduction gear set therein (not shown). The grill set 3 comprises a screen 31, screen covers 32 (each screen cover 32 are different from each other by the center hole 321), a socket 33, a rod 34, a number of hook rods 35 and a fixture 36.

The socket 33 has a non-circular shaped inner diameter center hole 331 and is secured in the center portion of the screen 31, the respective ends of the socket 33 is in round shape to be seating in recesses 11 of the case 1, respectively, one end of the socket 33 is inserted though the screen 31 and secured (by soldering clips or any other means), the other end of the socket 33 has formed with a step-like section 332 on its shank and a stopper 333 to block the screen cover 32. The step-like section 332 comprises at least an enlarged section and a reduced section, each section has a recess 334 at its bottom portion to receive a C-shaped clip 361 of the fixture 36 therein.

Figure 2:
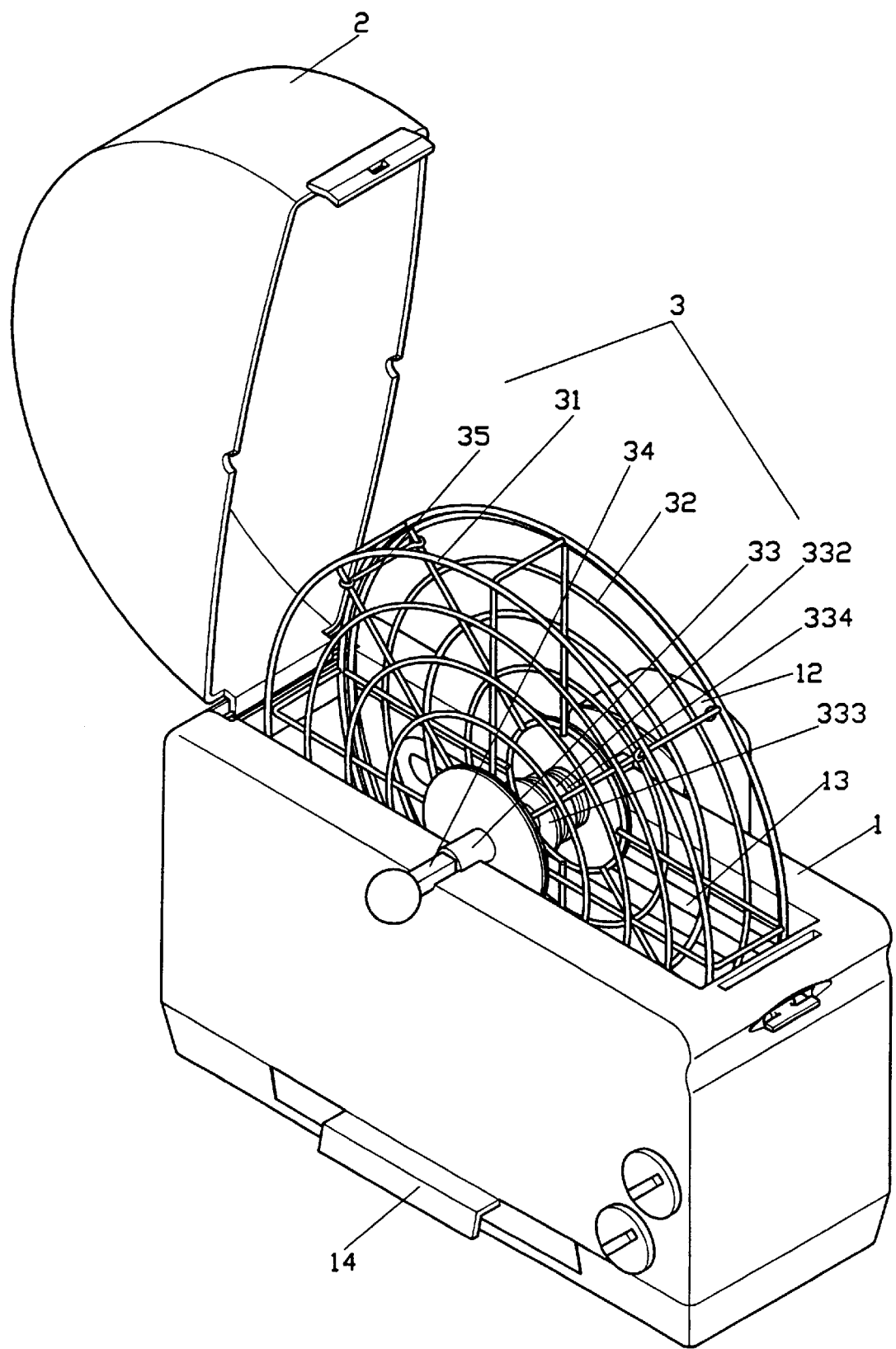
FIG. 2 is a perspective view of the present invention.
Figure 3:
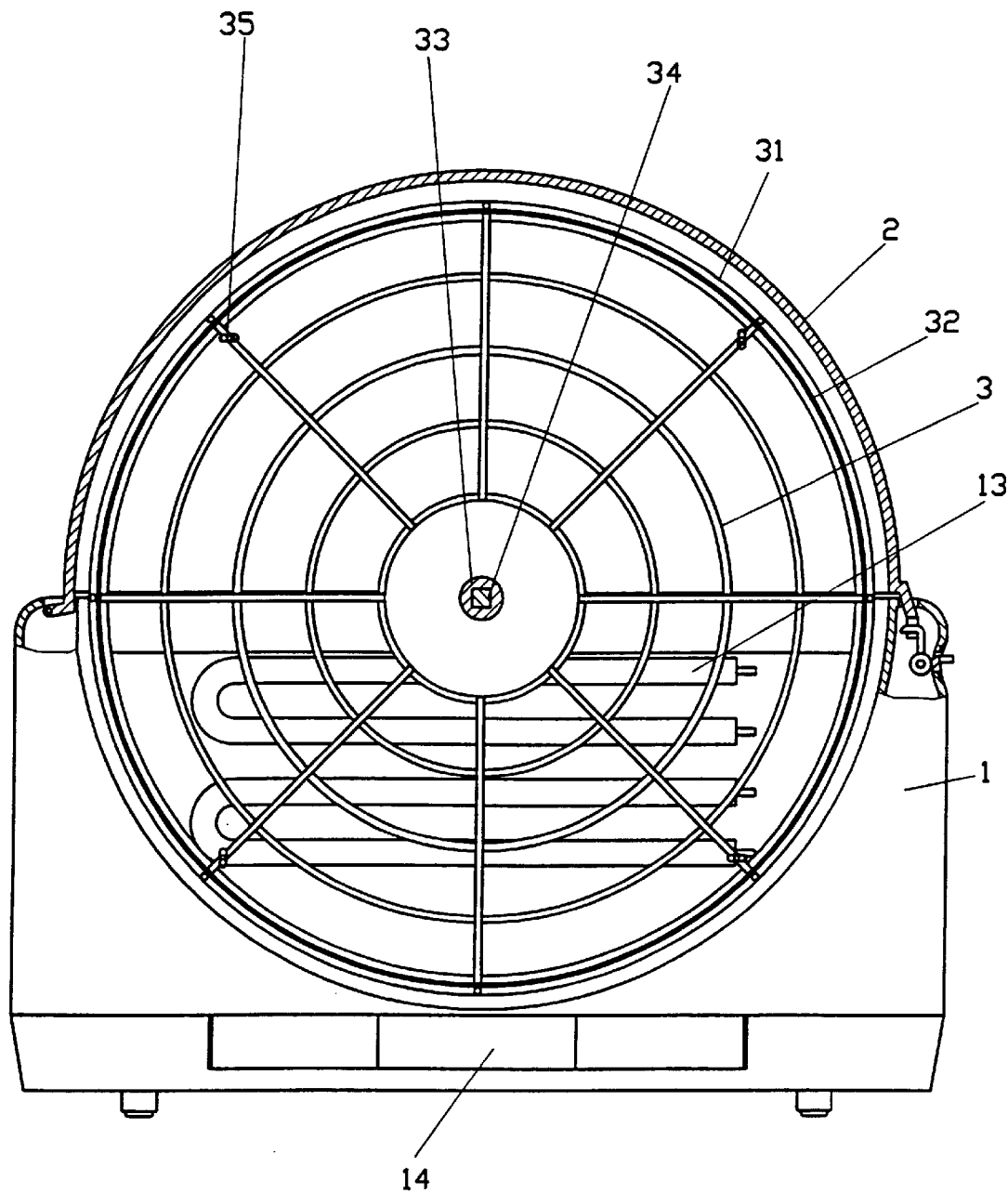
FIG. 3 is a side elevation view, partially sectioned.
Figure 4:
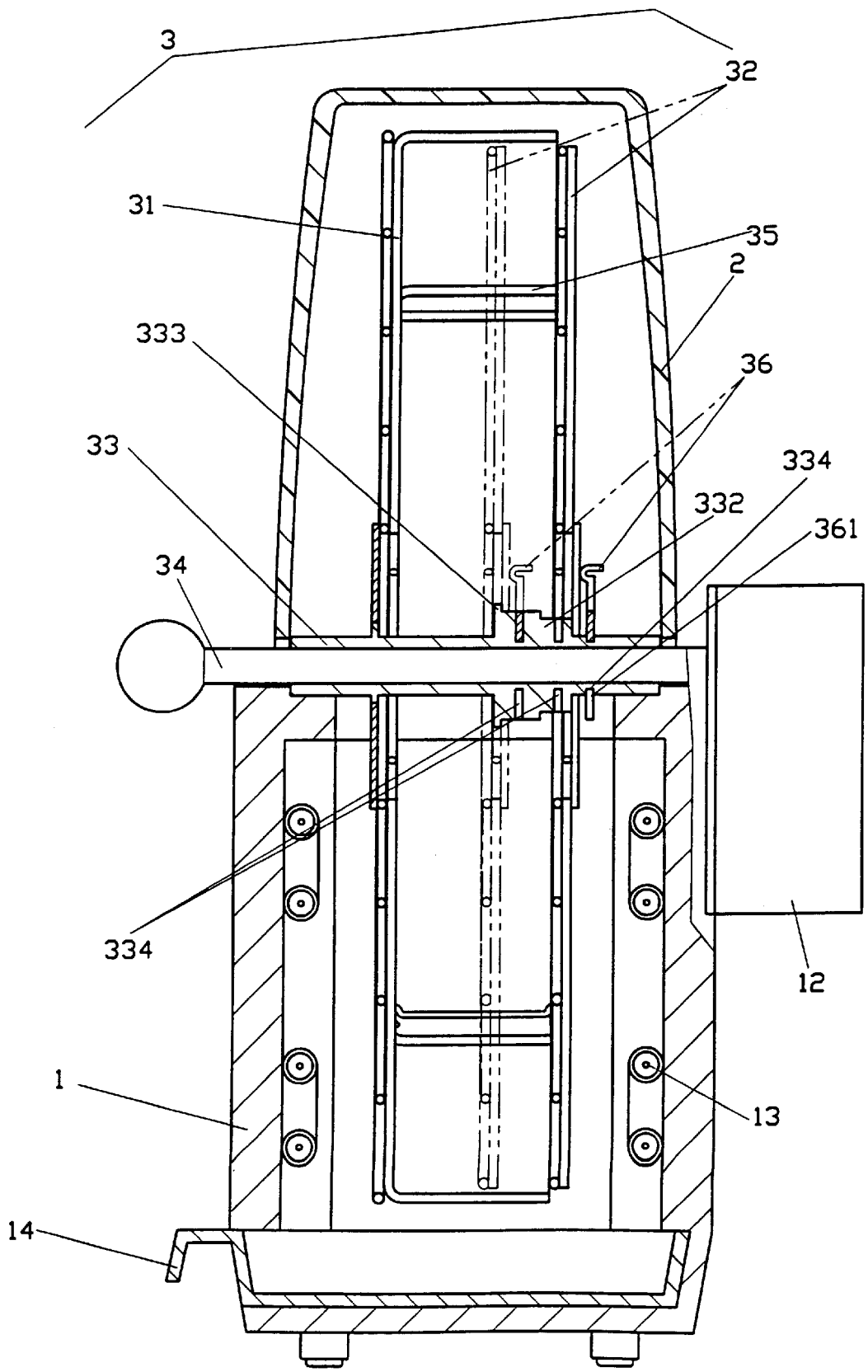
FIG. 4 is a front view of the present invention, partially sectioned.

Furthermore, the step-like section 332 and the recesses 334 are corresponding to the screen cover 32, and te step-like section 332 is corresponding in size with the center hole 321 of the screen cover 32. The rod 34 has a shape corresponding to the center hole 331, and having one end in a conical shape for insertion into the gear box 12 to be driven by the motor. The hook rod 35 has hooks 351 and 352 at respective ends for engaging the screen 31 and the screen cover 32 together. Thus, by adjusting the center hole 321 of the screen cover 32 and the step-like section 332 and the fixture 36 and hook rod 35, the grill's width may be adjustable Upon the screen 31 and the screen cover 32 are formed and are inserted into the step-like section 332 of the socket 33, and secured by the fixture 36 and hook rod 35, as shown in FIGS. 2 through 4, the grill 3 of the present invention is formed. The grill 3 is placed in the bottom portion of the case 1 and the rod 34 is inserted through the center hole 331 of the socket 33, whereas the two round-shaped ends of the socket 33 are seating in the recesses 11 of the case I with the conical shaped end of the rod 34 in the gear box 12 to be driven by the motor. The width of the grill 3, as show in FIG. 4, may varied, if the center hole 321 of the screen cover 32 is small, the corresponding step-like section will be the smaller diameter section and the grill 3 has a larger width.

The secure of the screen 31 and the screen cover 32 depends on the C-shaped clip 361 of the fixture 36 securing in the recess 334, and the hook rod 35 is to avoid the screen cover 32 edge from spread with respect to the screen 31.

Figure 5:
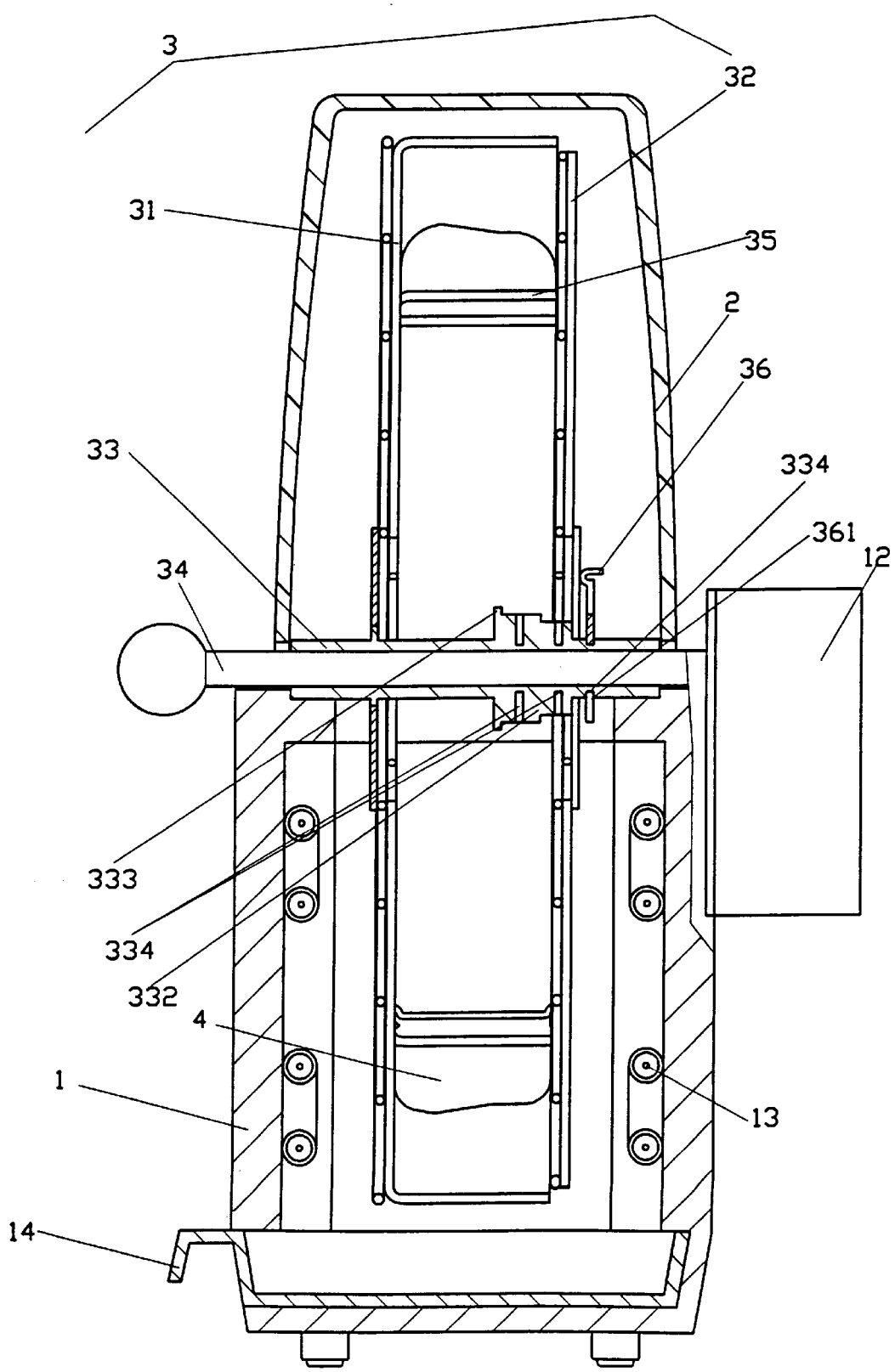
FIG. 5 is a view showing the griller in operation.

To operate, as shown in FIG. 5, place food 4 in the grill 3 and spin, any oil dripping from the food caused by the heating, will be dropped into the drip pan 14. Further, if the food to be prepared is not much, simply pull the rod 33 to disengage the conical shaped end of the rod 34 away from the gear box 12, and the spinning movement will be stopped.

I claim:

1. A griller comprising a case and a grill set seating within the case, wherein said case having a hollow body and electric heaters secured in respective inner side, and a gear box with motor inside, and said grill set is driven by said gear box, and the improvements comprising:

said case being formed with a recess at top portion, and said grill set being formed with a screen, screen cover, socket, rod and fixture wherein said socket secured in the center of said screen with two ends in round shape placed within said recess of said case, the shank of said socket being formed with a step-like section for insertion of said screen cover, said fixture being secured in said step-like section of said socket to facilitate assembling said screen and said screen cover, said rod secured in said socket having one end engaged with said gear box and driven by said motor.

2. The griller, as recited in claim 1, including at least two screen covers, each of said screen covers having a different size of center hole to be engaged with a hook rod with a different length to vary the width of said grill.

3. The griller, as recited in claim 1, wherein said case having connected at one end to a transparent cover which is able to be open from the other end.

4. The griller, as recited in claim 1, wherein said fixture having a C-shaped clip at the front end to be clipped into said recess.

5. The griller, as recited in claim 1, wherein said grill are formed with hook rod having hooks at the respect ends for engagement of said screen and said screen cover.

6. The griller, as recited in claim 1, wherein said case having a drip pan at the bottom portion.

* * * * *